United States Patent
Chen et al.

(10) Patent No.: US 6,724,211 B2
(45) Date of Patent: Apr. 20, 2004

(54) SYSTEM FOR VALIDATING AND MONITORING SEMICONDUCTOR TESTING TOOLS

(75) Inventors: Shun-An Chen, Kaohsiung (TW);
Li-Chung Lin, Pingtung Hsien (TW);
Yao-Tung Liu, Tainan (TW);
Yung-Min Cheng, Yung-Kang (TW);
Ming-Hui Lin, Kaohsiung (TW);
Hsin-Hom Chen, Taipei Hsien (TW);
Chun-Sheng Wang, Tainan (TW)

(73) Assignee: Taiwan Semiconductor Manufacturing Co., LTD, Hsin-Chu (TW)

( * ) Notice: Subject to any disclaimer, the term of this patent is extended or adjusted under 35 U.S.C. 154(b) by 0 days.

(21) Appl. No.: 09/949,656

(22) Filed: Sep. 12, 2001

(65) Prior Publication Data
US 2002/0158624 A1 Oct. 31, 2002

(30) Foreign Application Priority Data
Apr. 30, 2001 (TW) .......................... 90110258 A

(51) Int. Cl.[7] ................................ G01R 31/26
(52) U.S. Cl. ..................................... 324/765; 324/158.1
(58) Field of Search ................................ 324/73.1, 754, 324/760, 763, 765, 768, 158.1; 714/724; 702/117–119, 123

(56) References Cited

U.S. PATENT DOCUMENTS

| 5,654,632 A | * | 8/1997 | Ohno ....................... 324/158.1 |
| 5,861,660 A | | 1/1999 | McClure |
| 6,037,793 A | * | 3/2000 | Miyazawa et al. .......... 324/760 |
| 6,097,204 A | * | 8/2000 | Tanaka et al. ............... 324/765 |
| 6,246,971 B1 | * | 6/2001 | Kermani et al. ............. 702/119 |

* cited by examiner

Primary Examiner—David A. Zarneke
Assistant Examiner—Minh N. Tang
(74) Attorney, Agent, or Firm—Birch, Stewart, Kolasch & Birch, LLP

(57) ABSTRACT

A system for monitoring semiconductor testing tools comprises a tester testing a semiconductor device, whereby a test result is derived, a storage device storing a logic function corresponding to the semiconductor device, and a processor receiving the test result and the logic function from the tester and storage device respectively, and applying the logic function to the test result for validation.

32 Claims, 1 Drawing Sheet

SYSTEM FOR VALIDATING AND MONITORING SEMICONDUCTOR TESTING TOOLS

BACKGROUND OF THE INVENTION

1. Field of the Invention

The present invention relates to a system for validating and monitoring semiconductor testing tools, particularly to a validating and monitoring system which validates a setup condition and monitors performance of a testing tool for integrated circuit testing.

2. Description of the Prior Art

Validation of a testing tool is needed before the tool released to mass production. Monitoring of the tool is also needed during mass production. The validation and monitoring of the testing tool help to avoid wrong testing results of wafers and to do some corrections in time when an error occurs.

For example, the setup condition of a prober/tester is validated using a sample wafer before released to mass production. The sample wafer has been tested to derive original test results. The original test results are validated before the sample wafer is used to validating the testing tool. The prober/tester to be validated tests the sample wafer and derives another group of test results. A comparison of the original test results with those from the prober/tester determines if the setup condition of the prober/tester must be corrected.

The expensive sample wafer must be re-used for the sake of cost. Therefore, the number of times which each die on the sample wafer is tested for setup condition validation is recorded since there is a life time limitation for each die. The dices out of their life times are not used anymore.

There is also a selection rule of the dices for each kind of products to be tested. An operator of the setup condition validation selects the dices to be tested among those within their life times according to the rule.

Besides, the prober/tester is monitored during mass production. Some actions for correction are needed when an error occurs. For example, the testing is stopped or re-done when three or more test results in success are the same, failed or any one of the test results is not reasonable.

Conventionally, the previously described validation and monitoring are manually operated. The operator must record the numbers of times which the dices are tested, select the dices, compare the test results and decide an action according to the comparison results. However, manual operation causes mistakes easily.

SUMMARY OF THE INVENTION

Therefore, the object of the present invention is to provide a system for validating and monitoring semiconductor testing tools, wherein the validation and monitoring are automatically implemented.

The present invention provides a system for monitoring semiconductor testing tools comprising a tester testing a semiconductor device, whereby a test result is derived, a storage device storing a logic function corresponding to the semiconductor device, and a processor receiving the test result and the logic function from the tester and storage device respectively, and applying the logic function to the test result for validation.

The present invention further provides a system for validating semiconductor test tools using a semiconductor device which a first test result has been derived from and validated, the system comprising a tester testing the semiconductor device, whereby a second test result is derived, a storage device storing the first test result of the semiconductor device, and a processor receiving the first and second test result from the storage device and tester respectively, and comparing the first and second test result for validation of the second test result.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
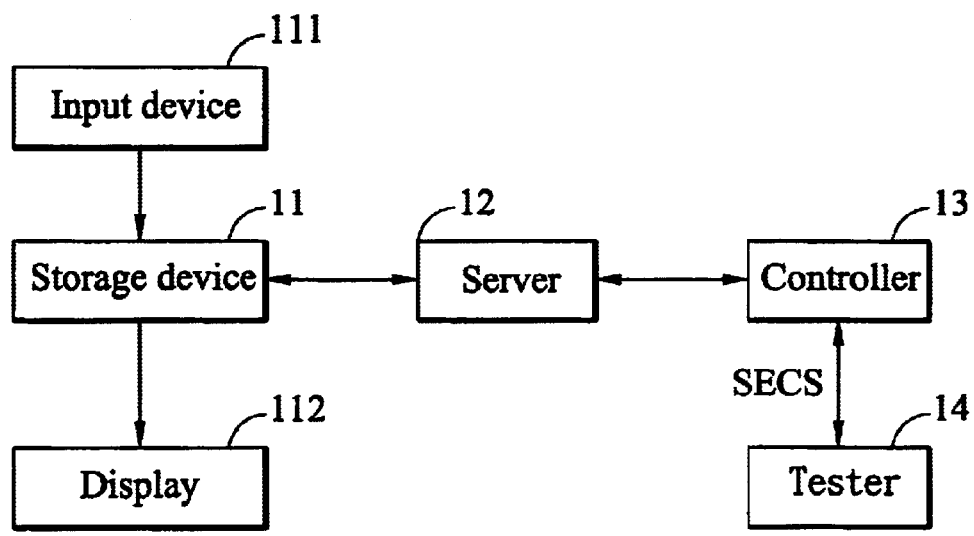
FIG. 1 is a diagram showing a system for validating semiconductor testing tools according to one embodiment of the invention.

FIG. 1 is a diagram showing a system for validating semiconductor testing tools according to one embodiment of the invention.

A validating system 1 comprises a tester 14, a storage device 11, an input device 111 and a display 112 connected to the storage device 11, a setup server 12, and a tool controller 13. A sample wafer (not shown) is tested by the tester 14.

The storage device 11 stores a database having selection rules for kinds of products to be tested, original test results of the dices on the sample wafer, numbers of times which the dices are tested and actions implemented by the tester 14 when the validation is failed, such as re-testing, modifying the setup condition and alarming. The database is modified through the input device 111. The content of the database is displayed on the display 112.

The setup server 12 is connected to the storage device 11 and the tool controller 13, whereby the setup server 12 receives and processes data from the storage device 11, and sends the processed data to the tool controller 13.

The tool controller 13 is connected to the tester 14 through a SECS tool link for receiving the test results from the tester 14 and sending control signals to the tester 14.

The operation of the validating system 1 is explained in the following.

The sample wafer is inserted into the tester 14. The controller 13 requests the setup server 12 to download data about the positions of the dices to be tested on the sample wafer. Then, the setup server 12 reads the selection rule and the numbers of times which the dices are tested, accordingly determines the positions of the selected dices and send them to the tool controller 13. The numbers of times which the dices are tested are also updated. The tool controller 13 guides the tester 14 through the SECS tool link to test the selected dices according to the data received from the setup server 12. The tester 14 then derives a group of test results and send them back to the tool controller 13 through the SECS tool link. Afterwards, the tool controller 13 uploads the test results to the setup server 12. The setup server also receives the original test results of the sample wafer and the actions when the validation is failed. After the setup server 12 compares the test results and accordingly decides the actions must be implemented by the tester 14, the actions are sent from the setup server 12 to the tool controller 13 guiding the tester 14 to implement the actions.

Figure 2:
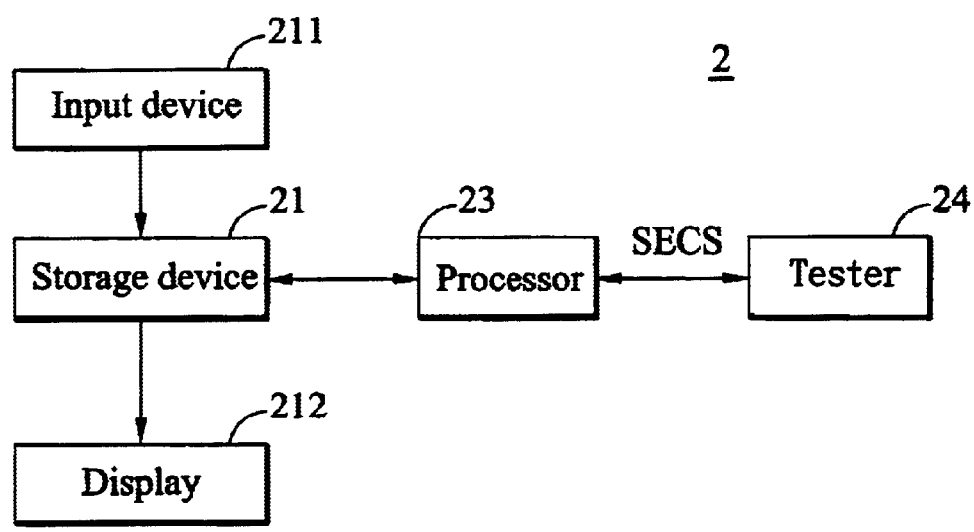
FIG. 2 is a diagram showing a system for monitoring semiconductor testing tools according to one embodiment of the invention.

FIG. 2 is a diagram showing a system for monitoring semiconductor testing tools according to one embodiment of the invention.

A monitoring system 2 comprises a tester 24, a storage device 21, an input device 211 and a display 212 connected to the storage device 21, and a processor 23. The test results form the tester 24 is monitored by the monitoring system 2.

The storage device 21 stores a database having a logic function generating a monitoring result and actions implemented by the tester 24 corresponding to the monitoring result. The logic function generates a failed monitoring result when three or more of the test results from the tester 24 in success are the same, failed or any one of them is not reasonable. The corresponding actions are to stop testing or alarm, and re-test. The database is modified through the input device 211. The content of the database is displayed on the display 212.

The processor 23 is connected to the storage device 21, whereby the processor 23 receives and processes data from the storage device 21. The processor 23 is also connected to the tester 24 through a SECS tool link for receiving the test results from and sending control signals to the tester 24.

The operation of the monitoring system 2 is explained in the following.

The processor 23 receives the logic function and actions from the storage device 21. The test results are sent from the tester 24 through the SECS tool link to the processor 23. The processor 23 then applies the logic function to the test results and generates a monitoring result. When a failed monitoring result is generated, a control signal of corresponding action is sent to the tester 24 to implement the action.

In conclusion, the invention eliminates the manual operation in the conventional validating and monitoring method, whereby the mistakes caused by the operator are avoided and the testing tool is corrected in time when testing error occurs.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for monitoring semiconductor testing tools comprising:
    a tester testing a semiconductor device, whereby a test result is derived;
    a storage device storing a logic function corresponding to the semiconductor device; and
    a processor receiving the test result and the logic function from the tester and the storage device respectively, and applying the logic function to the test result for validation of the tester.

2. The system as claimed in claim 1 wherein the semiconductor device is a wafer having dices thereon.

3. The system as claimed in claim 1 wherein the storage device further stores an action implemented by the tester when the validation is failed.

4. The system as claimed in claim 3 wherein the action is to re-test.

5. The system as claimed in claim 3 wherein the action is to stop testing.

6. The system as claimed in claim 3 wherein the action is to alarm.

7. The system as claimed in claim 1 further comprising an input device connected to the storage device.

8. The system as claimed in claim 1 further comprising a display connected to the storage device.

9. The system as claimed in claim 1 wherein the processor communicates with the tester through a SECS tool link.

10. A system for validating semiconductor test tools using a semiconductor device which a first test result has been derived from and validated, the system comprising:
    a tester testing the semiconductor device, whereby a second test result is derived;
    a storage device storing the first test result of the semiconductor device;
    a processor receiving the first and second test result from the storage device and the tester respectively, and comparing the first and second test result for validation of the second test result;
    a tool controller controlling the tester and receiving the second test result from the tester; and
    a setup server receiving the first and second test result from the storage device and the tool controller respectively, and comparing the first and the second test result.

11. The system as claimed in claim 10 wherein the semiconductor device is a wafer having dices thereon.

12. The system as claimed in claim 11 wherein the storage device further stores a selection rule and the dices are selectively tested according to the selection rule.

13. The system as claimed in claim 11 wherein the storage device further stores life times of the dices.

14. The system as claimed in claim 10 wherein the storage device further stores an action implemented by the tester when the validation is failed.

15. The system as claimed in claim 14 wherein the action is to re-test.

16. The system as claimed in claim 14 wherein the action is to stop testing.

17. The system as claimed in claim 14 wherein the action is to alarm.

18. The system as claimed in claim 10 wherein the processor communicates with the tester through a SECS tool link.

19. The system as claimed in claim 10 further comprising a display connected to the storage device.

20. The system as claimed in claim 10 further comprising an input device connected to the storage device.

21. A system for validating semiconductor test tools using a semiconductor device which a first test result has been derived from and validated, the system comprising:
    a tester testing the semiconductor device, whereby a second test result is derived;
    a storage device storing the first test result of the semiconductor device; and
    a processor receiving the first and second test result from the storage device and the tester respectively, and comparing the first and second test result for validation of the tester.

22. The system as claimed in claim 21 wherein the semiconductor device is a wafer having dice; thereon.

23. The system as claimed in claim 22 wherein the storage device further stores a selection rule and the dices are selectively tested according to the selection rule.

24. The system as claimed in claim 22 wherein the storage device further stores life times of the dices.

25. The system as claimed in claim 21 wherein the storage device further stores an action implemented by the tester when the validation is failed.

26. The system as claimed in claim 25 wherein the action is to re-test the semiconductor device.

27. The system as claimed in claim 25 wherein the action is to stop testing.

28. The system as claimed in claim 25 wherein the action is to alarm.

29. The system as claimed in claim 21 further comprising:
   a tool controller controlling the tester and receiving the second test result from the tester;
   a setup server receiving the first and second test result from the storage device and the tool controller respectively, and comparing the first and the second test result.

30. The system as claimed in claim 29 wherein the processor communicates with the tester through a SECS tool link.

31. The system as claimed in claim 21 further comprising a display connected to the storage device.

32. The system as claimed in claim 21 further comprising an input device connected to the storage device.

* * * * *